United States Patent
Budiman et al.

(10) Patent No.: US 9,459,802 B1
(45) Date of Patent: Oct. 4, 2016

(54) HYBRID-HDD THAT LIMITS DIRTY DATA IN NAND

(71) Applicant: KABUSHIKI KAISHA TOSHIBA, Tokyo (JP)

(72) Inventors: Mine Wonkyung Budiman, Livermore, CA (US); Richard M. Ehrlich, Saratoga, CA (US)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 3 days.

(21) Appl. No.: 14/673,763

(22) Filed: Mar. 30, 2015

(51) Int. Cl.
*G06F 12/02* (2006.01)
*G06F 3/06* (2006.01)
*G06F 12/08* (2016.01)

(52) U.S. Cl.
CPC ............ *G06F 3/0619* (2013.01); *G06F 3/064* (2013.01); *G06F 3/068* (2013.01); *G06F 3/0653* (2013.01); *G06F 3/0656* (2013.01); *G06F 3/0658* (2013.01); *G06F 3/0659* (2013.01); *G06F 12/0246* (2013.01); *G06F 12/0866* (2013.01); *G06F 2212/1032* (2013.01); *G06F 2212/152* (2013.01); *G06F 2212/205* (2013.01); *G06F 2212/217* (2013.01); *G06F 2212/222* (2013.01); *G06F 2212/253* (2013.01); *G06F 2212/281* (2013.01); *G06F 2212/305* (2013.01)

(58) Field of Classification Search
CPC .......... G06F 12/0238; G06F 12/0246; G06F 2212/214; G06F 2212/205
USPC ................................................... 711/103, 113
See application file for complete search history.

(56) References Cited

U.S. PATENT DOCUMENTS

| | | | |
|---|---|---|---|
| 8,024,516 B2 | 9/2011 | Miura | |
| 8,578,100 B1 | 11/2013 | Huynh et al. | |
| 8,656,097 B2 | 2/2014 | Lee et al. | |
| 2014/0115235 A1* | 4/2014 | Ito et al. | ........................ 711/103 |
| 2014/0281151 A1 | 9/2014 | Yu et al. | |
| 2015/0269081 A1* | 9/2015 | Shu et al. | ................... 369/53.42 |
| 2016/0117260 A1* | 4/2016 | Wu et al. | ....................... 713/193 |

\* cited by examiner

*Primary Examiner* — Than Nguyen
(74) *Attorney, Agent, or Firm* — Patterson & Sheridan, LLP (57) ABSTRACT

A hybrid hard disk drive (HDD) that includes a magnetic storage medium and a nonvolatile solid-state device limits the amount of data that are stored in the solid-state storage device but are not also stored in the magnetic storage device. By limiting such "flash-only" data to as much as can be flushed to the magnetic storage medium within a specified time, the hybrid HDD can flush all flash-only data to the magnetic storage medium immediately prior to a power-off of the drive. Thus, the hybrid HDD can employ a write cache, which relies on storing flash-only data in the hybrid HDD, without the disadvantage of storing flash-only data after shut-down.

20 Claims, 5 Drawing Sheets

HYBRID-HDD THAT LIMITS DIRTY DATA IN NAND

BACKGROUND

Hybrid hard disk drive (HDD) as one of storage devices include one or more rotating magnetic disks combined with nonvolatile solid-state (e.g., flash) memory. Generally, a hybrid HDD has both the capacity of a conventional HDD and the ability to access data as quickly as a solid-state drive, and for this reason hybrid HDDs are expected to be commonly used in laptop computers.

However, a drawback of the NAND-based memory cells in solid-state drives and hybrid HDDs is that such memory cells are only operable for a limited number of program/erase cycles. Furthermore, at higher temperatures, data retention of NAND memory cells is greatly reduced. For example, when single-level cell (SLC) NAND memory cells are elevated to a temperature greater than 70 to 80° C., even short-term retention of data of these NAND cells may become unreliable, and they cannot be considered a dependable nonvolatile data storage medium. This is because data stored in NAND cells may be lost at anytime under such conditions. For a hybrid HDD that includes multi-level cell (MLC) NAND memory, reliability is even more of an issue, since MLC cell reliability may be compromised after fewer program/erase cycles and at lower temperatures than SLC cells.

Reads from and writes to NAND memory are much faster than reads from and writes to a magnetic disk, so a significant advantage of hybrid HDDs over conventional HDDs is that the NAND memory included in a hybrid HDD can be used as a large read and write cache that reduces the frequency of relatively time-consuming disk accesses. However, implementation of a write cache in NAND memory necessitates storing the only copy of data associated with recently received write commands in NAND memory cells. As noted, under some conditions NAND memory cells may be unsuitable for long-term storage of the only copy of data in a data storage device. Thus, the improved performance provided to a hybrid HDD by a NAND-based write cache is offset by the fact that, under certain conditions, NAND memory cells are inherently less reliable than other storage media in the hybrid HDD.

SUMMARY

One or more embodiments provide systems and methods for storing data in a hybrid hard disk drive (HDD) that includes a magnetic storage medium and a nonvolatile solid-state device. Specifically, a hybrid HDD limits the amount of "flash-only" data that the hybrid HDD stores, where flash-only data are data that are stored in the solid-state storage device but are not also stored in the magnetic storage device. By limiting the flash-only data to as much as can be flushed to the magnetic storage medium within a specified time (for example, 3 seconds), the hybrid HDD can flush all flash-only data to the magnetic storage medium immediately prior to a power-off of the drive. Thus, the hybrid HDD can employ a write cache, which relies on storing flash-only data in the hybrid HDD, without the disadvantage of storing flash-only data after shut-down.

A data storage device, according to embodiments, includes a nonvolatile solid-state device, a magnetic storage medium, and a controller. In one embodiment, the controller is configured to track flash-only data, which are data that are stored in the solid-state storage device and are not also stored in the magnetic storage device, receive a write command, determine an estimated time to write for the flash-only data and write data associated with the write command to be stored in the magnetic storage device, cause the write data to be stored in the nonvolatile solid-state device if the estimated write time is less than a target write time, and cause the write data to be stored in the magnetic storage device if the estimated write time is greater than the target write time.

A method of storing data, according to an embodiment, is carried out in a data storage device that includes a nonvolatile solid-state device and a magnetic storage medium. The method includes tracking flash-only data, which are data that are stored in the solid-state storage device and are not also stored in the magnetic storage device, receiving a write command, determining an estimated write time for the flash-only data and write data associated with the write command to be stored in the magnetic storage device, causing the write data to be stored in the nonvolatile solid-state device if the estimated write time is less than a target write time, and causing the write data to be stored in the magnetic storage device if the estimated write time is greater than the target write time.

BRIEF DESCRIPTION OF THE DRAWINGS

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
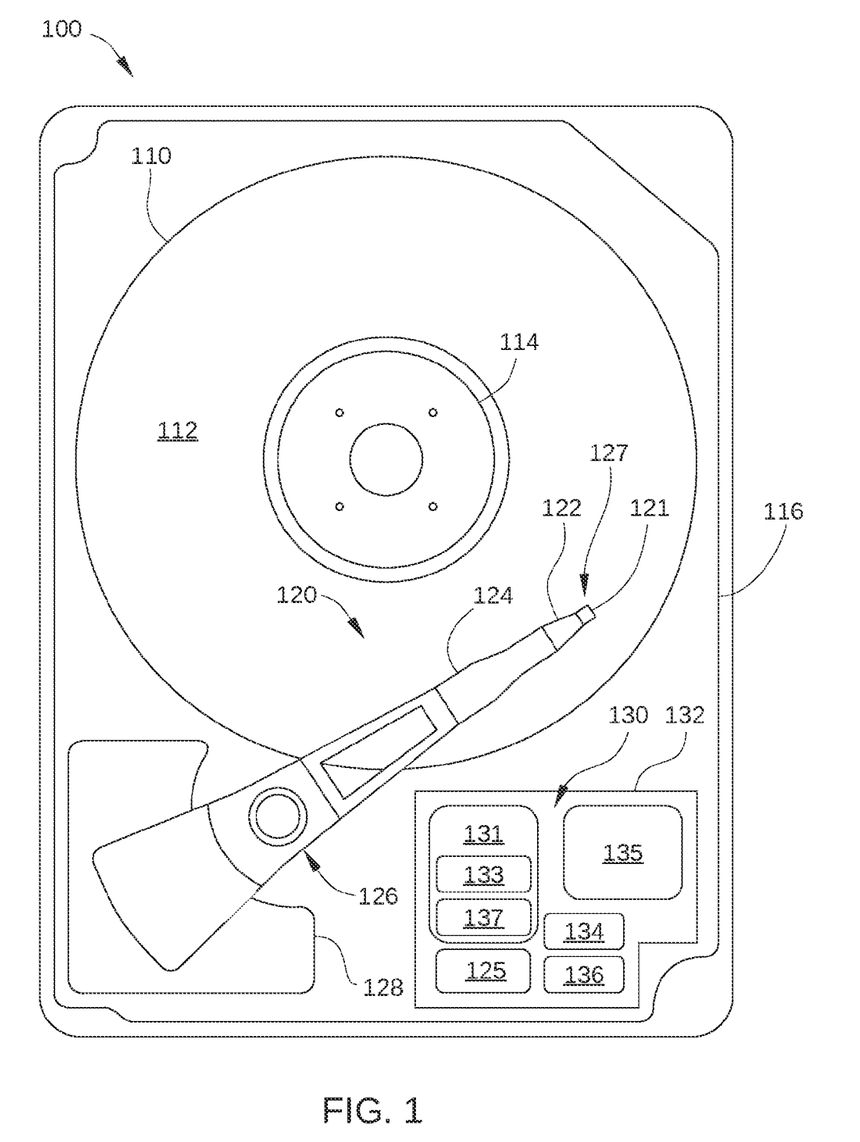
FIG. 1 is a schematic view of an exemplary hybrid hard disk drive (HDD), according to one embodiment.

FIG. 1 is a schematic view of an exemplary hybrid disk drive (HDD) 100, according to one embodiment. For clarity, hybrid HDD 100 is illustrated without a top cover. Hybrid HDD 100 includes at least one storage disk 110 that is rotated by a spindle motor 114 and includes a plurality of concentric data storage tracks. Spindle motor 114 is mounted on a base plate 116. An actuator arm assembly 120 is also mounted on base plate 116, and has a slider 121 mounted on a flexure arm 122 with a read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over the desired concentric data storage track disposed on the surface 112 of storage disk 110. Spindle motor 114, read/write head 127, and voice coil motor 128 are controlled by electronic circuits 130, which are mounted on a printed circuit board 132. Electronic circuits 130 include a read/write channel 137, a microprocessor-based controller 133, random-access memory (RAM) 134 (which may be a dynamic RAM and is used as a data buffer), and a flash memory device 135 and flash manager device 136. In some embodiments, read/write channel 137 and microprocessor-based controller 133 are included in a single chip, such as a system-on-chip 131. In some embodiments, hybrid HDD 100 may further include a motor-driver chip 125, which accepts commands from microprocessor-based controller 133 and drives both spindle motor 114 and voice coil motor 128. The read/write channel 137 communicates with the read/write head 127 via a preamplifier (not shown) that may be mounted on a flex-cable that is itself mounted on either the base plate 116, or the actuator arm 120 or both.

For clarity, hybrid HDD 100 is illustrated with a single storage disk 110 and a single actuator arm assembly 120. Hybrid HDD 100 may also include multiple storage disks and multiple actuator arm assemblies. In addition, each side of storage disk 110 may have an associated read/write head coupled to a flexure arm.

When data are transferred to or from storage disk 110, actuator arm assembly 120 sweeps an arc between an inner diameter (ID) and an outer diameter (OD) of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges on storage disk 110 by read/write head 127 to determine the position of read/write head 127 over a specific data storage track. The servo system determines an appropriate current to drive through the voice coil of voice coil motor 128, and drives said current using a current driver and associated circuitry.

Hybrid HDD 100 is configured as a hybrid HDD, in which nonvolatile data storage may be performed using storage disk 110 and/or flash memory device 135. In a hybrid HDD, nonvolatile memory, such as flash memory device 135, supplements the spinning storage disk 110 to provide faster boot, hibernate, resume and other data read-write operations, as well as lower power consumption. Such a hybrid HDD configuration is particularly advantageous for battery-operated computer systems, such as mobile computers or other mobile computing devices. In a preferred embodiment, flash memory device 135 is a nonvolatile storage medium, such as a NAND flash chip, that can be electrically erased and reprogrammed, and is sized to supplement storage disk 110 in hybrid HDD 100 as a nonvolatile storage medium. For example, in some embodiments, flash memory device 135 has data storage capacity that is orders of magnitude larger than RAM 134, e.g., gigabytes (GB) vs. megabytes (MB).

Figure 2:
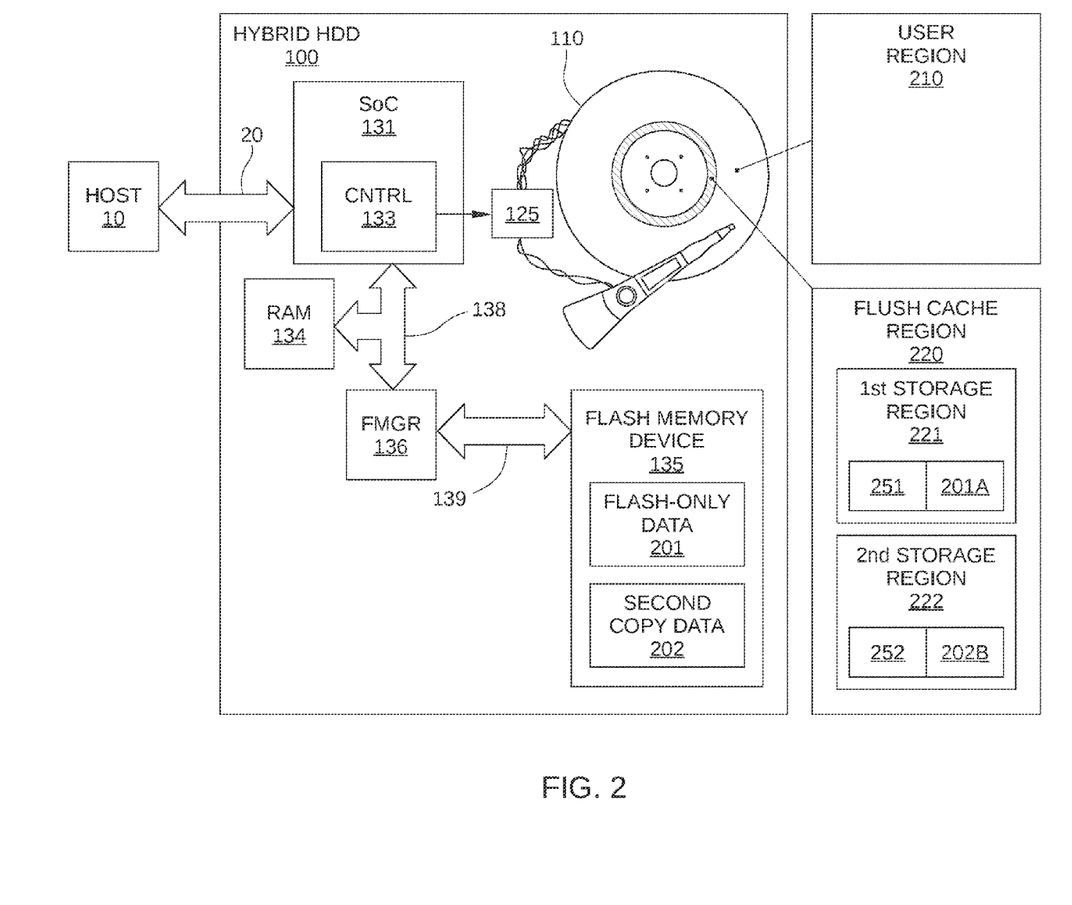
FIG. 2 illustrates an operational diagram of the hybrid HDD of FIG. 1 with elements of electronic circuits shown configured according to one embodiment.

FIG. 2 illustrates an operational diagram of hybrid HDD 100 with elements of electronic circuits 130 shown configured according to one embodiment. As shown, hybrid HDD 100 includes RAM 134, flash memory device 135, a flash manager device 136, system-on-chip 131, and storage disk 110. Hybrid HDD 100 is connected to a host 10, such as a host computer, via a host interface 20, such as a serial advanced technology attachment (SATA) bus.

In the embodiment illustrated in FIG. 2, flash manager device 136 controls interfacing of flash memory device 135 with a high-speed data path 138 and is connected to flash memory device 135 via a NAND interface bus 139. System-on-chip 131 includes microprocessor-based controller 133 and other hardware (including read/write channel 137) for controlling operation of hybrid HDD 100, and is connected to RAM 134 and flash manager device 136 via high-speed data path 138. Microprocessor-based controller 133 is a control unit that may include one or more microcontrollers, such as ARM microprocessors, a hybrid HDD controller, and any control circuitry within hybrid HDD 100. High-speed data path 138 is a high-speed bus known in the art, such as a double data rate (DDR) bus, a DDR2 bus, a DDR3 bus, or the like. In other embodiments, hybrid HDD 100 may be configured with different data interfaces and buses than those illustrated in FIG. 2.

Flash memory device 135 is configured to store flash-only data 201 and second copy data 202. Generally, flash-only data 201, second copy data 202, or any combination of each may be stored in a particular memory block of flash memory device 135. That is, specific memory blocks of flash memory device 135 are not dedicated to storing only flash-only data 201 while other memory blocks are dedicated to storing only second copy data 202. Thus, flash-only data 201 and second copy data 202 may each be stored in non-contiguous memory blocks or other regions of flash memory device 135.

Flash-only data 201 include data that are stored in flash memory device 135 and are not stored on storage disk 110, such as data used to populate a write cache for hybrid HDD 100. As data associated with a write command (referred to herein as "write data") are received by hybrid HDD 100, this write data may be written to flash memory device 135 into a so-called write cache rather than directly to storage disk 110. The contents of the write cache may then be written to physical locations on storage disk 110 that correspond to the logical block addresses (LBAs) referenced by the write command, either subsequent to and/or in parallel with receipt of other write data. In this way, write data can be stored in a nonvolatile storage medium of hybrid HDD 100 much more quickly than when write data are received by hybrid HDD 100 and stored directly on storage disk 110. For instance, the time to complete a write command for a page of write data may be on the order of a few hundred microseconds for flash memory device 135 and on the order of several milliseconds or more for storage disk 110.

In some embodiments, flash-only data 201 may include other data besides data associated with a write cache. For example, flash-only data 201 may include metadata or other data employed in the operation of flash memory device 135, such as program-erase counts for the memory blocks of flash memory device 135, or data associated with a logical-to-physical mapping function that maps cache entries in a read or write cache to physical addresses in flash memory device 135. The loss of such data can render some or all data stored in flash memory device 135 unusable or otherwise adversely affect the operation of flash memory device 135.

Second copy data 202 include data that are stored in flash memory device 135 and are also stored on storage disk 110. Thus, second copy data 202 are data for which a second copy exists on storage disk 110. For example, in some embodiments, second copy data 202 may include data used to populate a read cache for hybrid HDD 100. A read cache includes data that have been requested previously by host 10 and read from a slower permanent storage location, e.g., storage disk 110. The read cache temporarily keeps a copy of such data in order to accelerate the fulfillment of future requests for that data. Therefore, by definition, the data in a read cache in flash memory device 135 is a second copy of data that are also stored on storage disk 110. As such, there is another copy available in hybrid HDD 100 of any read cache data that may be lost due to poor data retention by flash memory drive 135, for example when hybrid HDD is stored for an extended period at an elevated temperature.

It is noted that the status of a particular set of data stored in hybrid HDD 100 (i.e., flash-only data 201 vs. second copy data 202) is determined irrespective of the particular set of data being stored in RAM 134 or any other volatile medium. Thus, data may also be stored in RAM 134 during operation of hybrid HDD and still be considered to be flash-only data 201. In fact, data that are determined to be flash-only data 201 are typically also initially stored in RAM 134 for some time interval after being received by hybrid HDD 100.

Storage disk 110 is configured with a user region 210 and a flush-cache region 220. User region 210 is configured to store conventional user data, such as write data from host 10 that are transmitted to hybrid HDD 100. Generally, each unit of such user data is associated with a unique LBA, and each LBA corresponds to a particular physical location (i.e., track and sector) of storage disk 110. User region 210 generally includes all usable portions of storage disk 110 except for flush-cache region 220, and makes up the vast majority of the storage capacity of storage disk 110. For example, user region 210 may include on the order of 100,000 data storage tracks or more, whereas flush-cache region 220 may include up to a few hundred data storage tracks.

Flush-cache region 220 may be configured to store at least one copy of flash-only data 201. To that end, flush-cache region 220 includes a first storage region 221 and, in some embodiments, a second storage region 222. First storage region 221 and second storage region 222 each include sufficient data storage tracks to store a version of flash-only data 201 and associated metadata. Thus, first storage region 221 is sized to store flash-only data 201A and metadata 251, and second storage region 222 is sized to store flash-only data 201B and metadata 252. In the embodiment illustrated in FIG. 2, flush-cache region 220 is located at the inner diameter of storage disk 110, but may be at any other technically feasible portion of storage disk 110. For example in some embodiments, flush-cache region 220 may be located at the outer diameter of storage disk 110, thereby allowing more data storage per rotation of storage disk 110. In yet other embodiments, flush-cache region 220 may be located in a central portion of storage disk 110 that is between the ID and OD of storage disk 110. In such embodiments, the average seek time associated with moving to flush-cache region 220 may be reduced.

Flash-only data 201A is a previously written version of flash-only data 201 that may be considered obsolete once a more recent version of flash-only data 201 in flash memory device 135 has been updated with additional write data. Furthermore, flash-only data 201A is a sequential write of a previous version of flash-only data 201 in first storage region 221. Consequently, the write data included in flash-only data 201A are not stored in the physical locations that correspond to the LBAs associated with this write data. Instead, flash-only data 201A are stored as shown in first storage region 221, even though the physical locations where flash-only data 201A are nominally supposed to be written on storage disk 110 are actually in user region 210. To enable subsequent writing of flash-only data 201A to the correct physical locations that correspond to these LBAs, metadata 251 includes metadata indicating these physical locations (e.g. tracks and sectors) on storage disk 110. Alternatively or additionally, metadata 251 may include the LBAs associated with flash-only data 201A that correspond to these physical locations. Similarly, flash-only data 201B is a sequential write of a previous version of flash-only data 201 and is stored in second storage region 222, and metadata 252 includes metadata indicating the physical locations on storage disk 110 where flash-only data 201B are supposed to be written and/or the LBAs associated with flash-only data 201B that correspond to these physical locations.

In some embodiments, flush-cache region 220 is configured to store two or more copies of flash-only data 201, so that the most recent version of flash-only data 201 can be written to alternate storage locations on storage disk 110, i.e., first storage region 221 and second storage region 222. Thus, when a new copy of flash-only data 201 is written to flush-cache region 220 of storage disk 110, the oldest version of the two previous versions of flash-only data 201 is overwritten, while the most recent of the two previous version of flash-only data 201 remains intact. For example, when flash-only data 201B is an older version of flash-only data 201 than flash-only data 201A, the new version of flash-only data 201 being stored in flush-cache region 220 is written to second storage region 222. Consequently, if a serious fault occurs while the new version of flash-only data 201 is being written to flush-cache region 220, the most recent version of flash-only data 201 on storage disk 110 (in this case flash-only data 201A) is not corrupted, thereby reducing or minimizing data loss due to the fault. Instead, only the oldest version of flash-only data 201 stored on storage disk 110, i.e., flash-only data 201B, is corrupted. In such embodiments, if a serious fault occurs while the new version of flash-only data 201 is being written to flush-cache region 220, such as an unexpected power loss, the most recent version of flash-only data 201 on storage disk 110 remains intact.

It is noted that in the case of such a fault, the copy of flash-only data 201 stored in flash memory 135 is very likely still available, unless hybrid HDD 100 remains powered off for an extended period of time of sufficient duration or at a sufficiently elevated temperature to compromise data retention in flash memory device 135. Therefore, provided hybrid HDD 100 is powered up after the above-described fault prior to data loss occurring in flash memory device 135, hybrid HDD 100 can write the version of flash-only data 201 that is still in flash memory device 135 to flush-cache region 220. If for some reason flash-only data 201 in flash memory device 135 is not available, hybrid HDD 100 still has the most recent version of flash-only data 201 previously written to storage disk 110, which in the above example is flash-only data 201A.

In operation, when host 10 informs hybrid HDD 100 that shut-down is imminent (for example via a STANDBY IMMEDIATE command), flash-only data 201 are written to flush-cache region 220 in anticipation of hybrid HDD 100 being shut down. In this way, all data stored in flash memory device 135 are also stored in some location on storage disk 110. Thus, if flash memory device 135 fails to retain all data stored therein after being powered off, for example due to storage in a high temperature environment, hybrid HDD 100 still includes a copy of any data lost by flash memory device 135.

Generally, after receiving a STANDBY IMMEDIATE command or other command from host 10 indicating shut-down, hybrid HDD 100 has a limited time to spin down storage disk 110 and park read/write head 127. For example, after issuing a command to hybrid HDD 100, host 10 may crash, lock up, or otherwise fault if no response is received from hybrid HDD 100 to the issued command after more than five seconds. Thus, in some embodiments, there is a target write time (e.g., five seconds) for hybrid HDD 100 to write flash-only data 201 to flush-cache region 220 after receiving any sort of shutdown command from host 10. In such embodiments, a maximum size of flush-cache region 220 and a maximum allowable size of flash-only data 201 may be based on the target write time, the rate at which hybrid HDD 100 can store flash-only data 201 in storage disk 110, and other factors. In some embodiments, the target write time may be shorter than the maximum time allowed without causing a fault in host 10. For example, the target write time may be selected based on what time is acceptable for a user to wait for hybrid HDD 100 to shut down, e.g. three seconds.

It is noted that the time required for hybrid HDD 100 to write flash-only data 201 to their correct physical locations in user region 210, instead of to the flush-cache region 220, depends not only on the total amount of data included in flush-cache data 201, but also on how flash-only data 201 are organized and on the physical locations on storage disk 110 that correspond to the LBAs associated with flash-only data 201. That is, the time required for hybrid HDD 100 to write flash-only data 201 to their correct physical locations in user region 210 is highly dependent on how randomly located flash-only data 201 is on storage disk 110. To wit, when flash-only data 201 includes 300 megabytes (MB) of sequential data, which may be written to storage disk 110 at about 100 MB per second, hybrid HDD 100 can write flash-only data 201 to their correct physical locations in user region 210 in about three seconds. By contrast, when flash-only data 201 includes 300 megabytes (MB) of 32 kilobyte (KB) randomly located blocks of data, hybrid HDD 100 may write flash-only data 201 to their correct physical locations in user region 210 in 45 seconds or more, which far exceeds any reasonable target write time. However, because flash-only data 201 (plus metadata 251) may be written as a sequential write in flush-cache region 220, flash-only data 201 may include a relatively large quantity of data (on the order of a few hundred MBs) and still be written completely within the target write time.

In some embodiments, flash-only data 201 are written to flush-cache region 220 as one sequential write, and metadata associated therewith may be written as a second sequential write. For example, in response to a STANDBY-IMMEDIATE command from host 10, hybrid HDD writes flash-only data 201 as flash-only data 201A into a first group of contiguous data storage tracks of first storage region 221, and writes metadata 251 in a second group of contiguous data storage tracks of first storage region 221. Alternatively, flash-only data 201A and metadata 251 may be written into a single group of contiguous data storage tracks of first storage region 221 as a single sequential write. In either case, flash-only data 201 can include a relatively large quantity of data, since flash-only data 201 is not written to storage disk 110 as a plurality of randomly located write commands in user region 220.

Figure 3:
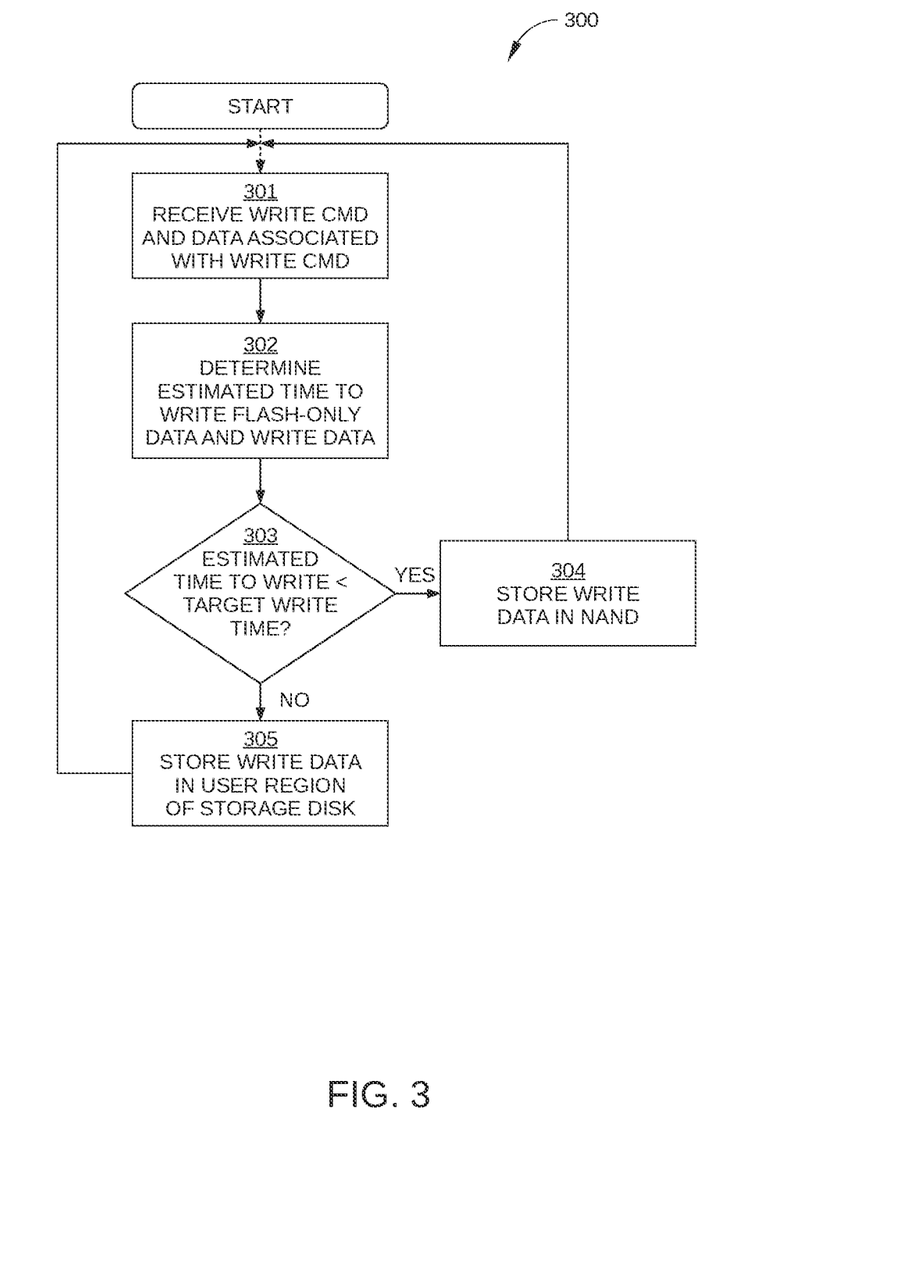
FIG. 3 sets forth a flowchart of method steps for storing data in the hybrid HDD of FIG. 1, according to one or more embodiments.

FIG. 3 sets forth a flowchart of method steps for storing data in a data storage device, such as hybrid HDD 100, according to one or more embodiments. Although the method steps are described in conjunction with hybrid HDD 100 in FIGS. 1 and 2, persons skilled in the art will understand that the method steps may be performed with other hybrid drives. The control algorithms for the method steps may reside in and/or be performed by controller 133, flash manager device 136, and/or any other suitable control circuit or system.

Generally, hybrid HDD 100 is configured to operate with a particular target write time, such as three seconds, five seconds, etc. In addition, first storage region 221 and second storage region 222 are configured based on the particular target write time and the sequential write rate of hybrid HDD 100, i.e., the rate at which hybrid HDD 100 can write data to storage disk 110 as a sequential write. For example, if data can be written sequentially to storage disk 110 at a rate of approximately 100 MB per second and the target write time for hybrid HDD 100 is three seconds, then first storage region 221 and second storage region 222 may each be sized to store approximately 300 MB of data. In some embodiments, the quantity of flash-only data 201 stored in flash memory device 135 is constant and is based on the sequential write rate of hybrid HDD 100 and the target write time.

As shown, method 300 begins at step 301, where microprocessor-based controller 133 or other suitable control circuit or system receives a write command and data associated with the write command, i.e., write data, from host 10. The write command references a sequential group of LBAs, indicating that host 10 requests that the data associated with these LBAs be stored in hybrid HDD 100.

In step 302, microprocessor-based controller 133 determines an estimated time to write for flash-only data 201 and the write data received in step 301 to be stored on storage disk 110. The estimated time to write is based on the tangential and radial location on storage disk 110 corresponding to each LBA associated with flash-only data 201 and on the relative position of these tangential and radial locations. Accurate determination of the estimated time to write is a compute-intensive task, and may be performed with write-reordering algorithms commonly employed by conventional HDDs and implemented in firmware. In some embodiments, step 302 is performed for each write command received by hybrid HDD 100. In other embodiments, to reduce the computational resources expended in determining the estimated time to write, step 302 may be performed either periodically, after a specific number of write commands have been received, or after a particular amount of write data have been received.

In step 303, microprocessor-based controller 133 determines whether the estimated write time determined in step 302 is less than the target write time for hybrid HDD 100. If no, method 300 proceeds to step 305. If yes, method 300 proceeds to step 304. In step 304, microprocessor-based controller 133 stores the write data associated with the write command in flash memory device 135 (NAND) and method 300 proceeds back to step 301. In step 305, microprocessor-based controller 133 stores the write data received in step 301 in user region 210 of storage disk 110 in the physical locations that correspond to the LBAs associated with the write command.

Thus, when flash-only data 201 and the write data received in step 301 can be stored to storage disk 110 in less than the target write time, the write data are added to flash-only data 201 in flash memory device 135. By contrast, when microprocessor-based controller 133 calculates that flash-only data 201 and the write data received in step 301 cannot be stored to storage disk 110 in less than the target write time, the write data are written directly to storage disk 110, even though adding this write data to the write cache in flash memory device 135 is a faster process.

In sum, in response to receiving a write command from host 10, how hybrid HDD 100 stores data associated with the write command is based on an estimated write time for the combination of flash-only data 201 and write data associated with the write command to be stored on storage disk 110. If flash-only data 201 and the write data can be stored on storage disk 110 in less than a target write time, hybrid HDD 100 stores the write data associated with the new write command in flash memory device 135, thereby adding the write data to flash-only data 201.

Figure 4:
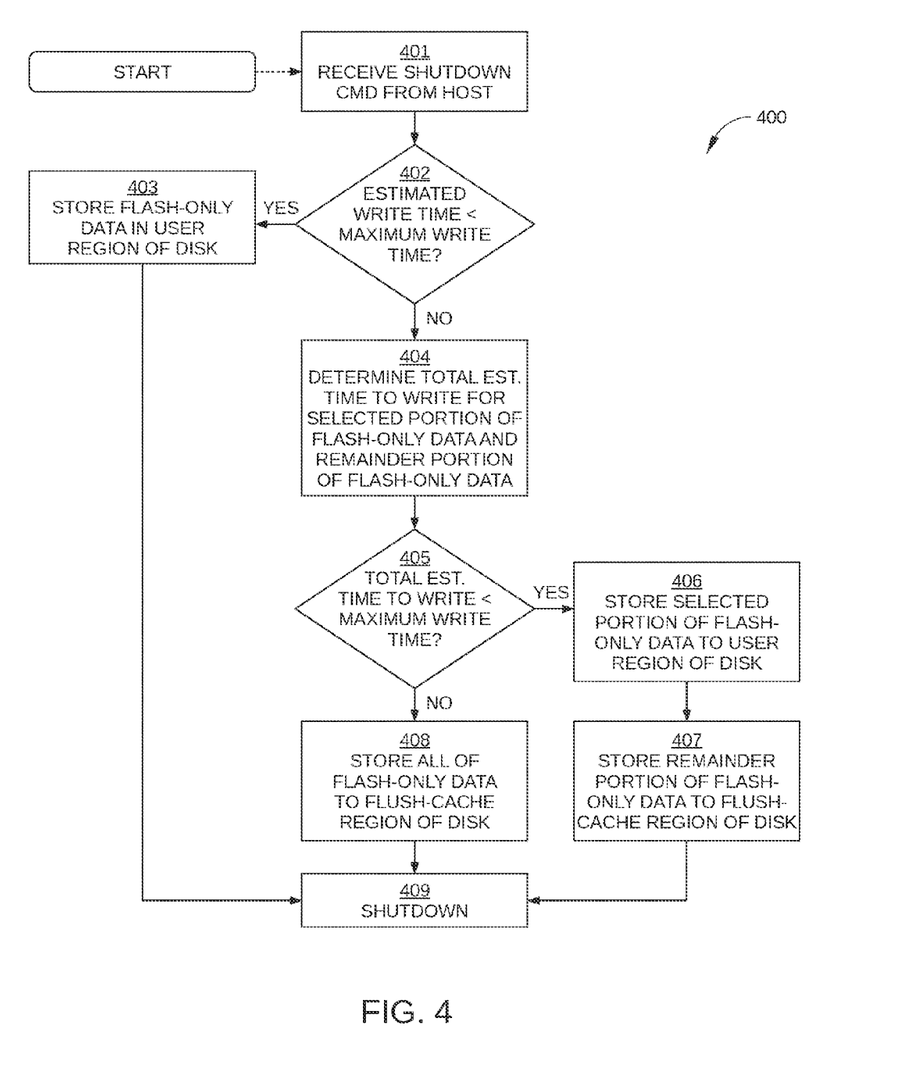
FIG. 4 sets forth a flowchart of method steps for flushing a write cache and related data in the hybrid HDD of FIG. 1 when the hybrid HDD receives a shutdown command, according to one or more embodiments.

FIG. 4 sets forth a flowchart of method steps for flushing a write cache and related data in a data storage device when the data storage device, such as hybrid HDD 100, receives a shutdown command, according to one or more embodiments. Although the method steps are described in conjunction with hybrid HDD 100 in FIGS. 1 and 2, persons skilled in the art will understand that the method steps may be performed with other hybrid drives. The control algorithms for the method steps may reside in and/or be performed by controller 133, flash manager device 136, and/or any other suitable control circuit or system.

As shown, method 400 begins at step 401, where microprocessor-based controller 133 or other suitable control circuit or system receives a shutdown command from a host. For example, the shutdown command may be a STANDBY-IMMEDIATE, a STANDBY command, or equivalent. In some embodiments, a FLUSH-CACHE command may be received in step 401 rather than a shutdown command.

In step 402, microprocessor-based controller 133 determines whether an estimated write time for flash-only data 201 is less than a maximum write time for hybrid HDD 100. The maximum write time may be a maximum allowable time or any other predetermined target time for hybrid HDD 100 to store flash-only data 201 in user region 210 of storage disk 110. It is noted that storage of any data in user region 210 entails storage of the data in the physical locations in storage disk 110 (e.g., track and sector) that correspond to the LBAs associated with the data, and therefore is generally not a single sequential write, as occurs when flash-only data 201 are written to first storage region 221 or second storage region 222. The maximum write time may be significantly shorter than the target write time for hybrid HDD 100, for example on the order of one or two seconds. Step 402 is performed to determine whether flash-only data 201 can be stored in the appropriate locations in user region 210 upon shutdown, rather than being copied from flush-cache region 220 to user region 210 at a later time. If the estimated write time is less than the above-described maximum write time, method 400 proceeds to step 403. If the estimated write time is greater than the maximum write time, method 400 proceeds to step 404.

In step 403, microprocessor-based controller 133 causes flash-only data 201 to be stored in appropriate locations in user region 210. Thus, flash-only data 201 are written in the physical locations in user region 210 that correspond to the LBAs associated with flash-only data 201. Method 403 then proceeds to step 409.

In step 404, microprocessor-based controller 133 determines a total estimated time to write for storing a selected portion of flash-only data 201 in user region 210 of storage disk 110 and a remainder portion of flash-only data 201 in flush-cache region 220 of storage disk 110. The selected portion may include data in flash-only data 201 associated with write commands that exceed a minimum quantity of data, e.g., 1 MB, 2 MB, etc. For example, in some embodiments, the selected portion includes all write commands that exceed 2 MB, which are the write commands that can be most efficiently written to storage disk 110. Alternatively or additionally, the selected portion may include write commands that correspond to locations on storage disk 110 that are proximate each other, e.g., on the same track or adjacent tracks. The remainder portion of flash-only data 201 includes all of flash-only data 201 except the above-described selected portion. The total estimated time to write is the time required for hybrid HDD 100 to store the selected portion of flash-only data 201 in user region 210 and remainder portion of flash-only data 201 in flush-cache region 220. Because in some embodiments the selected portion of flash-only data 201 includes data that can be written to storage disk relatively quickly, the total estimated write time may be a relatively short time interval that is less than the target write time for hybrid HDD 100, for example one or two seconds.

In step 405, microprocessor-based controller 133 determines whether the total estimated time to write is less than a maximum write time for hybrid HDD 100. The maximum write time may be equal to or less than the target write time for hybrid HDD 100. If the total estimated time to write is less than the maximum write time, method 400 proceeds to step 406. If the total estimated time to write is greater than the maximum write time, method 400 proceeds to step 408.

In step 406, microprocessor-based controller 133 causes the above-described selected portion of flash-only data 201 to be stored in user region 210 of storage disk 110. Thus, the selected portion of flash-only data 201 is written in the physical locations in user region 210 that correspond to the LBAs associated with the selected portion of flash-only data 201.

In step 407, microprocessor-based controller 133 causes the above-described remainder portion of flash-only data 201 to be stored in flush-cache region 220 in a single sequential write operation. The remainder portion of flash-only data 201 includes all data in flash-only data 201 that are not included in the selected portion of flash-only data 201. Typically, the remainder portion of flash-only data 201 includes data associated with smaller write commands and write commands that are more randomly located on storage disk 110. Because the remainder portion of flash-only data 201 are written as a single sequential write, the fact that these data are associated with LBAs that are located randomly across storage disk 110 has little effect on how quickly hybrid HDD 100 completes step 407. In step 407, metadata associated with flash-only data 201 are stored in flush-cache region 220. Method 400 proceeds to step 409.

In step 408, which is performed when the total estimated time to write is determined to be greater than the maximum write time, flash-only data 201 are stored in flush-cache region 220 of storage disk 110. In addition, metadata associated with flash-only data 201 are stored in flush-cache region 220. In embodiments in which flush-cache region 220 includes two or more storage regions, e.g., first storage region 221 and second storage region 222, flash-only data 201 and the associated metadata are stored in the storage region that includes the oldest previously written version of flash-only data 201. Step 408 is completed in less than the target write time for hybrid HDD 100, because the size of flash-only data 201 is controlled, in method 300, so that all of flash-only data 201 can be written in flush-cache region 220 in less than the target write time. Method 400 proceeds to step 409.

In step 409, microprocessor-based controller 133 parks read/write head 127, spins down storage disk 110, and sends an acknowledgment to host 10 that the shutdown is complete, all prior to expiration of the target write time.

In some embodiments, a total quantity of flash-only data 201 is limited during operation so that most or all of flash-only data 201 can be stored to the correct respective physical locations in user region 210 when a shutdown command is received from host 10. For example, the total quantity of flash-only data 201 may be limited to a few hundred MBs, a quantity of data that can usually be written to storage disk 110 in less than a typical target write time. One such embodiment is illustrated in FIG. 5.

Figure 5:
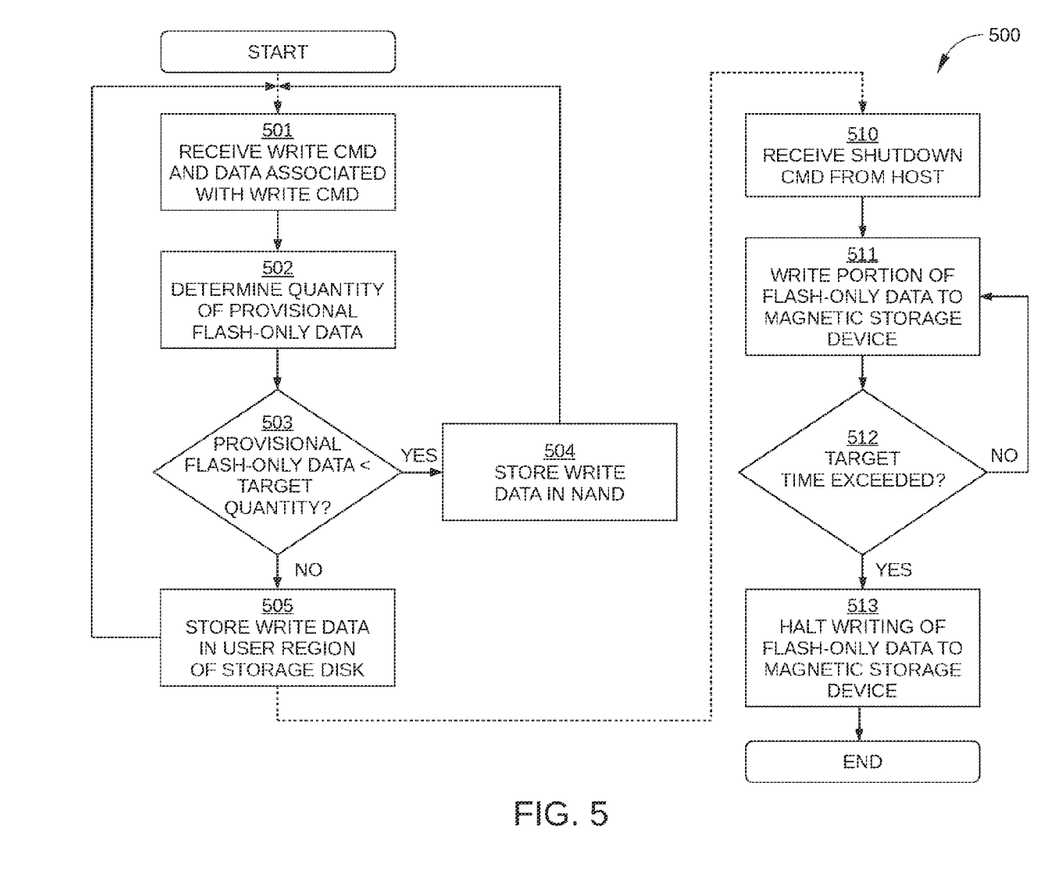
FIG. 5 sets forth a flowchart of method steps for storing data in a data storage device, according to one or more embodiments.

FIG. 5 sets forth a flowchart of method steps for storing data in a data storage device, such as hybrid HDD 100, according to one or more embodiments. Although the method steps are described in conjunction with hybrid HDD 100 in FIGS. 1 and 2, persons skilled in the art will understand that the method steps may be performed with other hybrid drives. The control algorithms for the method steps may reside in and/or be performed by controller 133, flash manager device 136, and/or any other suitable control circuit or system.

As shown, method 500 begins at step 501, where microprocessor-based controller 133 or other suitable control circuit or system receives a write command and data associated with the write command, i.e., write data, from host 10. The write command references a sequential group of LBAs, indicating that host 10 requests that the data associated with these LBAs be stored in hybrid HDD 100. In step 502, microprocessor-based controller 133 determines a quantity of provisional flash-only data, where provisional flash-only data include the combination of the current flash-only data 201 and the write data received in step 501. In step 503, microprocessor-based controller 133 determines whether the quantity of provisional flash-only data determined in step 502 is less than a target quantity of data, for example 300 MBs. If no, method 500 proceeds to step 505. If yes, method 500 proceeds to step 504. In step 504, microprocessor-based controller 133 stores the write data associated with the write command in flash memory device 135 (NAND) and method 500 proceeds back to step 501. In step 505, microprocessor-based controller 133 stores the write data received in step 501 in user region 210 of storage disk 110 in the physical locations that correspond to the LBAs associated with the write command. Thus, in method 500, the total quantity of flash-only data 201 is not increased with the addition of the write data associated with a write command when such an increase causes the quantity of flash-only data 201 to exceed a particular target quantity of data. In this way, the quantity of data that may not be written to storage disk 110 in the event of a STANDBY-IMMEDIATE command is reduced or eliminated.

In step 510, microprocessor-based controller 133 receives a shutdown command from host 10. For example, the shutdown command may be a STANDBY-IMMEDIATE, a STANDBY command, or equivalent. In some embodiments, a FLUSH-CACHE command may be received in step 510 rather than a shutdown command. In step 511, microprocessor-based controller 133 causes a portion of flash-only data 201 to be written to storage disk 110. In some embodiments, the portion may be a specific quantity of data, for example 1 MB. In step 512, microprocessor-based controller 133 determines if a target time for hybrid HDD 100 has been exceeded. If no, method 500 proceeds back to step 511; if yes, method 500 proceeds to step 513. In step 513, microprocessor-based controller 133 halts the writing of flash-only data to storage disk 110, since continuing to write flash-only data 201 to storage disk 110 after the target time has been exceeded can cause a fault to occur in host 10. Thus, in some situations, a remainder portion of flash-only data 201 may not be written to storage disk 110 before hybrid HDD 100 shuts down.

In sum, embodiments described herein provide systems and methods for storing data in a hybrid HDD that includes a magnetic storage medium and a nonvolatile solid-state device. The hybrid HDD limits the amount of flash-only data that the hybrid HDD stores, thereby ensuring that all such flash-only data can be copied to the magnetic storage device within a specified time in response to a shutdown command from a host. Consequently, the hybrid HDD can employ the nonvolatile solid-state device as a write cache without relying on the nonvolatile solid-state device for storing the only copy of write data after shutdown.

While the foregoing is directed to embodiments of the present invention, other and further embodiments of the invention may be devised without departing from the basic scope thereof, and the scope thereof is determined by the claims that follow.

We claim:

1. A data storage device comprising:
    a nonvolatile solid-state storage device;
    a magnetic storage device that includes a magnetic disk; and
    a controller configured to track flash-only data, which are data that are stored in the solid-state storage device and are not also stored in the magnetic storage device;
    receive a write command;
    determine an estimated time to write for the flash-only data and write data associated with the received write command to be stored in the magnetic storage device;
    cause the write data to be stored in the nonvolatile solid-state device if the estimated time is less than a target time; and
    cause the write data to be stored in the magnetic storage device if the estimated time is greater than the target time.

2. The data storage device of claim 1, wherein the target time comprises a time limit associated with shutting down the data storage device.

3. The data storage device of claim 1, wherein the controller is configured to determine the estimated time based on the flash-only data and the write data being written to the magnetic storage device as a single sequential write.

4. The data storage device of claim 1, wherein the controller is configured to:
    in response to a command to shut down the data storage device, cause all of the flash-only data to be written as a single sequential write in the magnetic storage device.

5. The data storage device of claim 4, wherein the single sequential write includes a write data portion and a metadata portion associated with the write data portion.

6. The data storage device of claim 4, wherein the flash-only data comprise data that are associated with LBAs that are not contiguous.

7. The data storage device of claim 1, wherein the controller is configured to:
    in response to a command to shut down the data storage device, cause a first portion of the flash-only data to be written in physical locations of the magnetic storage device that correspond to respective LBAs associated with the first portion of the flash-only data, and a second portion of the flash-only data, that includes all of the flash-only data except the first portion, to be written as a single sequential write in the magnetic storage device.

8. The data storage device of claim 7, wherein the controller is configured to determine that a total estimated time to write the first portion in physical locations of the magnetic storage device that correspond to respective LBAs associated with the first portion and to write the second portion as a single sequential write in the magnetic storage device is less than a maximum write time.

9. The data storage device of claim 1, wherein the controller is configured to:

in response to a command to shut down the data storage device, cause all of the flash-only data to be written in physical locations of the magnetic storage device that correspond to respective LBAs associated with the flash-only data.

10. The data storage device of claim 9, wherein the controller is configured to determine that an estimated time to write all of the flash-only data in physical locations of the magnetic storage device that correspond to respective LBAs associated with the flash-only data is less than a maximum write time.

11. A method of storing data in a data storage device that includes a nonvolatile solid-state storage device and a magnetic storage device, the method comprising:
- tracking flash-only data, which are data that are stored in the solid-state storage device and are not also stored in the magnetic storage device;
- receiving a write command;
- determining an estimated time for the flash-only data and write data associated with the received write command to be stored in the magnetic storage device;
- causing the write data to be stored in the nonvolatile solid-state device if the estimated time is less than a target time; and
- causing the write data to be stored in the magnetic storage device if the estimated write time is greater than the target time.

12. The method of claim 11, wherein the target time comprises a time limit associated with shutting down the data storage device.

13. The method of claim 11, further comprising determining the estimated time based on the flash-only data and the write data being written to the magnetic storage device as a single sequential write.

14. The method of claim 11, further comprising:
- in response to a command to shut down the data storage device, causing a first portion of the flash-only data to be written in physical locations of the magnetic storage device that correspond to respective LBAs associated with the first portion of the flash-only data, and a second portion of the flash-only data, that includes all of the flash-only data except the first portion, to be written as a single sequential write in the magnetic storage device.

15. The method of claim 14, further comprising determining that a total estimated time to write the first portion in physical locations of the magnetic storage device that correspond to respective LBAs associated with the first portion and to write the second portion as a single sequential write in the magnetic storage device is less than a maximum write time.

16. The method of claim 11, further comprising:
- in response to a command to shut down the data storage device, causing all of the flash-only data to be written in physical locations of the magnetic storage device that correspond to respective LBAs associated with the flash-only data.

17. The method of claim 16, further comprising determining that an estimated time to write all of the flash-only data in physical locations of the magnetic storage device that correspond to respective LBAs associated with the flash-only data is less than a maximum write time.

18. A method of storing data in a data storage device that includes a nonvolatile solid-state storage device and a magnetic storage device, the method comprising:
- tracking flash-only data, which are data that are stored in the solid-state storage device and are not also stored in the magnetic storage device;
- receiving a write command;
- determining a quantity of provisional flash-only data, wherein the provisional flash-only data include the data that are stored in the solid-state storage device and write data that are associated with the write command;
- causing the write data to be stored in the nonvolatile solid-state device if the quantity of provisional flash-only data is less than a target quantity; and
- causing the write data to be stored in the magnetic storage device if the quantity of provisional flash-only data is greater than the target quantity.

19. The method of claim 18, further comprising, in response to a command to shut down the data storage device, causing at least a portion of the provisional flash-only data to be written to the magnetic storage device during a time interval that is less than a target write time.

20. The method of claim 19, further comprising, after the target write time is exceeded, halting writing of the provisional flash-only data to the magnetic storage device, so that a remainder portion of the provisional flash-only data are not written to the magnetic storage device before the data storage device is shut down.

* * * * *